Feb. 21, 1950      E. L. BEECHER      2,497,972
SHOCK ABSORBER CONSTRUCTION
Filed May 13, 1947
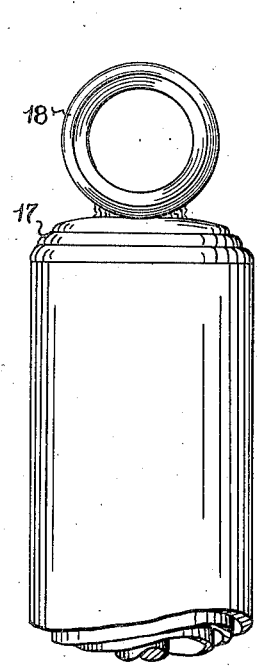
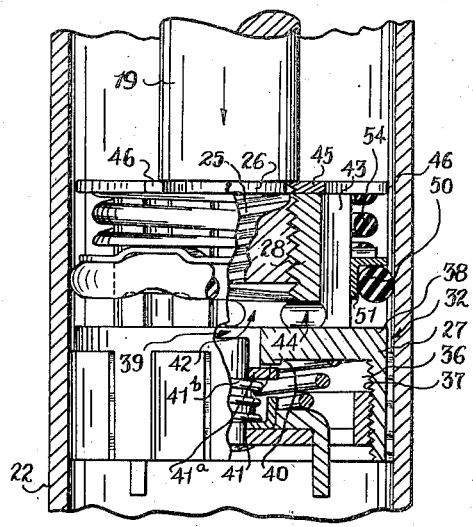
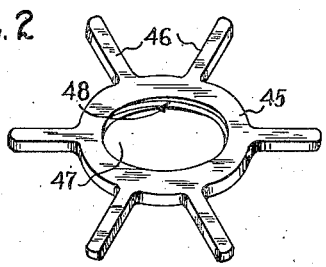
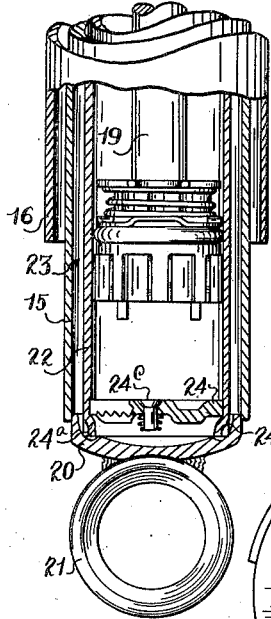
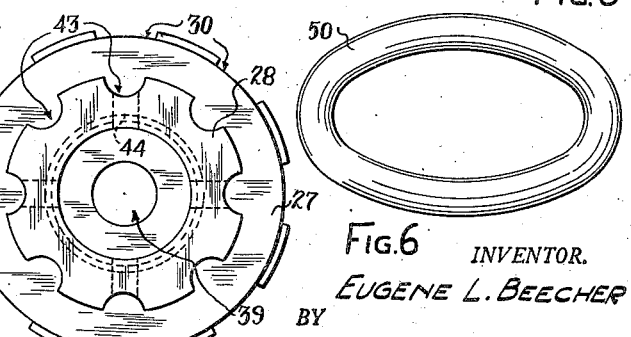
INVENTOR.
EUGENE L. BEECHER
BY
ATTORNEYS Patented Feb. 21, 1950

2,497,972

UNITED STATES PATENT OFFICE 2,497,972

SHOCK ABSORBER CONSTRUCTION

Eugene L. Beecher, Cleveland Heights, Ohio, assignor to The Gabriel Company, Cleveland, Ohio, a corporation of Ohio Application May 13, 1947, Serial No. 747,695

3 Claims. (Cl. 188—88)

This invention pertains to a shock absorber and, more particularly, to a fluid shock absorber.

Although the invention is applicable to various type shock absorbers, it is illustrated and explained herein by way of example as embodied in a direct double-acting hydraulic shock absorber. In certain of its aspects the invention is an improvement on the shock absorber structure disclosed in my Patent #2,396,227 dated March 12, 1946, and the patent application of William G. Patriquin, Serial No. 750,901, now U. S. Patent 2,487,471, filed May 28, 1947, in which patent and patent application the piston of the shock absorber has a groove in which is positioned a packing ring mounted on a continuous rigid carrier ring, the piston being formed in two parts to enable the ring to be positioned in the groove with the two parts being held in assembled relationship on and by the piston rod. In the construction therein shown, the piston rod has a continuous circumferential groove spaced from one end with the intermediate portion of the rod partially threaded. One part of the piston is supported in the groove and comprises a circular disclike member having a central opening of less diameter than the diameter of the rod and an eccentric opening of larger diameter than the diameter of the rod in overlapping relationship with the central opening forming a bayonet-type slot in the member. The member forms the upper wall of the ring groove and has passages through which the fluid of the shock absorber may pass on reciprocation of the piston. The other part of the piston comprises an upper cylindrical member forming the base of the groove and a lower cylindrical member of larger diameter, the upper surface of which forms the lower wall of the groove. The upper member has a central threaded aperture for threaded engagement with the threaded end of the piston rod and pins extending upwardly from the upper surface for engaging in openings in the disclike member for aligning the passages therein with passages in the base of the groove and preventing sideward movement of the disclike member whereby it is prevented from moving transversely on the piston rod. With such a construction, assembly is somewhat difficult because of the necessity of aligning the pins with the openings in the disclike member. Cocking or tilting of the disclike member on the piston rod is possible because of the bayonet type opening and consequent limited bearing area of the side of the member on the piston rod groove wall. Further, the area of the passages through the member is somewhat limited and non-uniformly distributed. Because the threading on the rod stops short of the groove, forming the threads is relatively difficult.

An object of the present invention is the provision of a new and improved shock absorber construction of the type referred to having a piston rod and a two-part piston which enables a circumferentially continuous bearing of a disclike part of the piston against the upper wall of a groove on the rod, requires no alignment of the two parts of the piston, simplifies the threading operation of the lower end of the piston rod, provides a greater and balanced passage area through the disclike part, is simple in construction, and is easily assembled.

Another object of the invention is the provision of a new and improved shock absorber construction including a piston rod having a circumferential groove spaced from one end, the portion of the rod between the groove and the end being completely threaded with threads having a root diameter at least equal to the diameter of the groove wherefore a threading tool may advance into the groove on the completion of the threading operation, thus prolonging the useful life of and enabling a greater number of rods to be threaded without resharpening of the threading tool.

Another object of the invention is the provision of a new and improved shock absorber construction including a piston rod and a two-part piston mounted on the lower end thereof, the piston rod having a transverse circumferentially extending groove spaced from the lower end in which an upper disclike part of the piston is positioned and may abut against the upper wall of the groove around substantially the entire circumference thereof whereby to prevent cocking or tilting of the part when assembled on the rod.

Another object of the invention is the provision of a new and improved shock absorber including a piston rod and a two-part piston mounted on the lower end thereof, the piston rod having a groove adjacent the lower end for receiving an upper part of the piston, the portion of the piston rod between the groove and the lower end, and the upper part of the piston being so formed that a central opening in the part may be of a minimum dimension whereby fluid passages radially outwardly from the central opening may be of greater area and symmetrically positioned for facilitating the flow of hydraulic shock absorber fluid thereby.

Another object of the invention is the provision of a new and improved shock absorber construction including a piston rod and a two-part piston mounted on the lower end thereof, the rod having a groove spaced from the lower end with the portion of the rod between the groove and the end being threaded to a uniform depth of threaded groove, the upper part of the piston comprising a disclike member having a central opening of less diameter than the diameter of the rod, which opening is threaded for passage over the threaded end of the rod for positioning in the groove, the lower part of the piston having a central threaded aperture for threaded engagement with the rod into abutting relationship with the upper part whereby to form the completed piston in firmly assembled relationship.

The invention resides in certain constructions and combinations and arrangements of parts, and further objects and advantages will be apparent to those skilled in the art to which it relates from the following description of the preferred embodiment described with reference to the accompanying drawings forming a part of this specification, and in which:

Fig. 1 is a longitudinal elevational view of a direct double-acting hydraulic shock absorber embodying the present invention, with certain of the parts including the housing and cylinder broken away in part to show the piston and piston rod in elevation;

Fig. 2 is a fragmentary sectional view on a larger scale than Fig. 1 through the work cylinder of the shock absorber shown in Fig. 1, the piston being broken away to show the construction thereof in greater detail;

Fig. 3 is a perspective elevational view of a member forming an upper part of the piston;

Fig. 4 is a fragmentary sectional view of the lower end of the piston rod with the member shown in Fig. 3 in assembled relationship therewith;

Fig. 5 is a perspective elevational view of a packing ring carrier for the piston packing;

Fig. 6 is a perspective elevational view of the packing ring; and

Fig. 7 is a top elevational view of a member forming a body part of the piston.

A shock absorber embodying the present invention is illustrated in the drawing and is, by way of example, a direct double-acting tubular telescoping hydraulic shock absorber of the type shown and described in the aforementioned patent and patent application. Only those parts of the shock absorber which are necessary to a complete understanding of the present invention are herein shown and described in detail. Reference to the aforementioned patent and patent application is made for a complete showing and description of those parts of the shock absorber not fully shown and described.

Referring to the drawings, the shock absorber shown comprises a substantially cylindrical casing 15 which has relative telescoping movement within a cylindrical guard housing 16 that is spaced radially outwardly from the casing 15. The upper end of the housing 16 is closed by an inverted cup-shaped closure or cap member 17 provided on its outer side with an eye 18 while a piston rod 19 is operatively connected to the cap member 17 and eye 18. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle, similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means, well known in the art, wherefore relative movement between the frame and axle of the vehicle will cause relative telescoping movement between the casing 15 and the housing 16 and relative movement of the piston rod 19 and the piston secured thereto in the pressure or working cylinder, as will be well understood.

A pressure or working cylinder 22 of the shock absorber is disposed within the casing 15 in spaced concentric relationship therewith so that the space defined by the casing 15, cylinder 22, closure member 20, and a closure member (not shown) for the upper end of the casing and cylinder constitutes a reservoir 23 for the oil or liquid or fluid in the shock absorber.

The lower end of the cylinder 22 extends into the cup-shaped closure member 20 and is secured thereto by suitable means understood in the art. The cylinder 22 slightly upwardly of the lower end has secured therein a closure plate 24. The cylinder 22 below the closure plate 24 is provided with an inwardly extending bead 24a which serves to retain the closure plate in position, while the cup-shaped closure member 20 is provided with a plurality of circumferentially spaced internal grooves or channels 24b which place the reservoir 23 in communication with the space between the closure plate 24 and the bottom of the cup-shaped closure member 20. The closure plate 24 may also be provided with either a fixed or a valve controlled orifice (not shown) communicating the space between the closure plate 24 and the cup-shaped closure member 20 with the interior of the cylinder 22 and permitting hydraulic fluid to pass therethrough with a restricted or limited flow upon reciprocation of the piston in the cylinder 22. The closure plate 24 is also provided with a replenishing valve 24c, the purpose of which is well understood in the art.

The piston rod 19 spaced from its lower or inner end is provided with a transverse circumferentially extending annular recess or groove 26 having a base 26a and upper and lower walls 26b, 26c, respectively. The portion of the piston rod 19 between the lower groove wall 26c is provided with a helical thread forming groove 25, the inner or root diameter of which is preferably uniform and equal to or just slightly greater than the diameter of the groove base 26a. The axial or longitudinal width of the groove 26 is preferably greater than a pitch length between the threads 25 such that when the threads 25 are formed by suitable cutting tools, the cutting tools may complete their thread cutting operation by advancing into the metal free space of the groove, providing an increased tool life over that which would otherwise be possible if the thread groove terminated short of the annular groove and the cutting tool thus stopped its thread cutting operation while still imbedded in the metal.

The piston is preferably formed in two parts and comprises a body which may be formed in various ways, but in the embodiment shown is a die casting. The piston body includes a lower and larger portion 27 and an upper and reduced portion 28. The periphery of the lower portion 27 of the piston body is provided with a plurality of circularly spaced axially extending grooves or passages 30, and said grooves or passages are deeper at their lower ends than they are at their upper ends for the purpose of decreasing the resistance of the bypass flow of fluid through the grooves during the impact or compression stroke of the piston. The portion 27 above the grooves 30 is of less diameter than the internal diameter of the cylinder 22, wherefore an annular space 32 is provided between the cylinder and the periphery of the upper end of the piston portion 27.

In the present illustration eight of the grooves 30 are shown, but it should be understood that the number of these grooves or passages may be varied.

The lower portion 27 of the piston body is provided with a counterbore 36, the wall of which is threaded as indicated at 37. The inner end of the counterbore 36, that is, the upper end of the portion 27 of the piston body, is separated from the upper reduced or smaller piston portion 28 by a wall 38 in the center of which is a bore 39 communicating with the counterbore 36 and with a larger central bore 42 in the upper portion 28 of the piston body. The wall 38 surrounding the bore 39 is provided with an annular impact valve seat boss 40 projecting into the counterbore 36 and provided with three radially extending grooves or notches 41 angularly spaced circularly of the seat boss 40. The bore 39 is opened and closed to communication with the counterbore 36 and thus the lower side of the piston by a valve member 41a normally biased to the closed position by a spring 41b. The notches 41 provide a bleeding action past the valve member 41a upon movement of the piston in either direction.

The upper part 28 of the piston body is provided with the previously referred to central bore 42 which is threaded so that the threaded end 25 of the piston rod 19 can be screwed into the bore 42 in uniting the piston body to the piston rod. The upper portion 28 of the piston body is also provided radially outwardly of the bore 42 with a plurality of circularly spaced axially extending peripheral recesses or grooves 43 which extend from the piston portion 27 to the end of the piston portion 28. The recesses 43 are substantially semicircular in cross section and are angularly spaced circumferentially of the piston portion 28, there being eight of such recesses illustrated herein. The recesses 43 can be die cast or otherwise formed in the piston body. The piston portion 28 is provided with four radially extending ports 44 that place the lower end of the bore 42 into communication with every alternate one of the eight axially extending recesses 43.

The other part of the piston comprises a flat circular washerlike member 45 having a plurality, and as shown six, circumferentially spaced arms 46 extending radially outwardly from the outer periphery thereof. The washerlike member 45 has a central circular opening 47 therethrough, the diameter of which is less than the diameter of the piston rod 19, the walls of the opening having helical thread forming grooves 48 of the same pitch as the threads 25 on the lower end of the piston rod 19. The washerlike member 45 has a width slightly less than the axial width of the groove 26 such that when it is positioned in the groove 26 as shown in Fig. 4 by first threading it over the threads 25, it will be free of such threads, free to rotate in the groove and abut squarely against the upper groove wall 26b. The piston body as shown is threaded on the lower or inner end of the piston rod 19 with the upper end of the upper piston portion 28 in abutting engagement with the lower side of the washer 45. With the construction shown, the upper side of the washerlike member 45 will then abut the upper groove wall 26b throughout substantially the entire circumferential extent thereof wherefore cocking or tilting of the member relative to the axis of the piston rod 19 will be substantially prevented. The outer diameter of the circular portion of the washerlike member 45 is preferably only slightly greater than the diameter of the piston rod 19 wherefore because of the circumferential spacing of the radial arms 46 a maximum area of passage is provided therethrough between the chamber above the piston and the peripheral recesses or grooves 43.

The piston body and the washerlike member 45 may be assembled on the lower or inner end of the piston rod 19 simply and without the necessity of aligning the washerlike member with the piston body on the assembly step. The lower side of the radial arms 46 forms an interrupted upper wall of a packing ring groove otherwise defined by the outer surface of the upper part 28 of the piston body as a base and the upper surface of the piston portion 27 as the lower wall.

In the embodiment of the invention shown, a flexible packing and valve ring 50 of normally circular cross section and formed of any suitable material, such as synthetic rubber for example, is mounted on a carrier 51 which is slidable on the upper portion 28 of the piston body, that is to say, in the packing ring groove just referred to. The carrier 51 is in the form of a ring of angular cross section having an arm 52 that extends longitudinally or axially of the piston and which contacts the piston portion 28 and slides therealong and a radially extending arm 53 which overlies the upper axial side of the ring 50 as viewed in the drawings. It will thus be seen that the ring 50 moves with the carrier 51 toward and away from the piston portion 27 upon changes in direction of piston movement, and that when the ring 50 is in the position shown in Fig. 1 it acts as a valve to close the space 32 and the passages or grooves 30 to communication with the upper side of the piston. While in the position indicated in Fig. 2, said space and passages are open and are in communication with the passages 43, thereby permitting a flow of hydraulic fluid from the lower side of the piston of the shock absorber to the upper side thereof. A coil spring 54 is mounted on the piston portion 28 and abuts at its ends the radial arms 46 of the washer 45 and the carrier 51 and exerts pressure on the carrier toward the portion 27 of the piston body, normally biasing the ring 50 to the valve closed position. The ring 50 and carrier assembly are movable as a unit upon a sufficient differential in hydraulic pressure being developed during the impact stroke of the piston on opposite sides of the ring 50 to overcome the force of the spring 54.

The radially extending arm 53 of the carrier 51 generally undulates axially in a circumferential direction to form a plurality of alternate ring engaging flats 53a and a plurality of other flats 53b axially displaced upwardly from the plane of the ring engaging flats. The ring groove thus formed between the arm 53 and the piston portion 27 when in the position shown in Fig. 1 varies from a minimum axial width slightly less than to a maximum width slightly greater than the cross-sectional diameter of the ring 50. The ring 50 is preferably flat in its normal and unstressed state, and, when supported on the carrier 51, its upper axial side abuts against the ring engaging flats 53a and is spaced from the lower surface of the axially displaced flats 53b. The lower axial side of the ring 50 when in the position shown in Fig. 1 abuts against the piston portion 27 providing a fluid seal, preventing flow of hydraulic fluid from the passages 43 to the passage 30 and thus past the piston on the upward or recoil stroke. Upon opposite movement of the piston, however, the portions of the ring 50 opposite the axially displaced portions 53b may move upwardly away from the piston portion 27 slightly opening the passages 30, 43 to restricted bleeding communication through spaced cutaway portions 52a in the lower edge of the axially extending arm 52. As shown, the portions 52a are aligned with the upwardly displaced flats 53b.

Thus it will be seen that an embodiment of the invention has been described which accomplishes the objects of the invention hereinbefore referred to and others. It is not believed necessary to specifically describe a cycle of operation of the shock absorber disclosed herein since the manner in which the various parts of the shock absorber function is well understood and described in the art, particularly in the aforesaid patent and patent application. Suffice it to say that the present construction offers less restriction to the flow of fluid past the piston allowed by the valve actions, as well as simplifying the structure, facilitating assembly, and decreasing the cost of manufacture.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

Having thus described my invention, I claim:

1. In a shock absorber of the direct double-acting type having a cylinder, a piston having a larger portion slidable in said cylinder and provided with peripheral passages extending from end to end of said portion and a smaller portion extending from one end of said larger portion and spaced radially inwardly from said cylinder and provided with a central threaded bore, a packing ring movable on said smaller portion and engaging said cylinder, and spring means on said smaller portion and engaging said ring and urging it against said larger portion to close the said peripheral passages therein; the improvement which comprises a piston rod having an end connected to said piston, said rod being provided with a circular groove spaced from said end and with screw threads extending from said groove to said end and screwed into said threaded bore, a disk-like member having a central threaded opening and screwed over said threaded rod end and into said groove, said member being of such thickness as to be capable of free rotation in said groove, said member when said rod is fully screwed into said threaded bore being clamped against rotation between a wall of said groove and the free end of said smaller piston portion and acting as an abutment for said spring means.

2. The improvement in a shock absorber as defined in claim 1 and wherein said improvement further consists in said disk-like member being in the form of a flat ring and having a series of circularly spaced radially extending arms projecting from the outer circumference of said ring while the inner circumference of said ring is screw-threaded and defines the opening for said rod, said ring engaging the free end of said smaller piston portion and said arms also engaging the free end of said smaller piston portion and extending radially beyond the circumference of said smaller portion toward said cylinder and acting as the abutment for said spring means.

3. The improvement in a shock absorber as defined in claim 1 and wherein said improvement further consists in providing said one end of said rod with threads, the inner or root diameter of which substantially equals the depth of said groove.

EUGENE L. BEECHER.

REFERENCES CITED

The following references are of record in the file of this patent:

UNITED STATES PATENTS

| Number | Name | Date |
|---|---|---|
| 2,182,581 | Casper | Dec. 5, 1939 |
| 2,396,227 | Beecher | Mar. 12, 1946 |

OTHER REFERENCES

Tool Engineering; Turning, Boring, and Grinding by Dowd & Curtis, first edition, pp. 164, 165, and 257.